No. 740,833. PATENTED OCT. 6, 1903.
R. EVANS & I. E. FRASER.
SAW FILING DEVICE.
APPLICATION FILED AUG. 19, 1902.
NO MODEL.
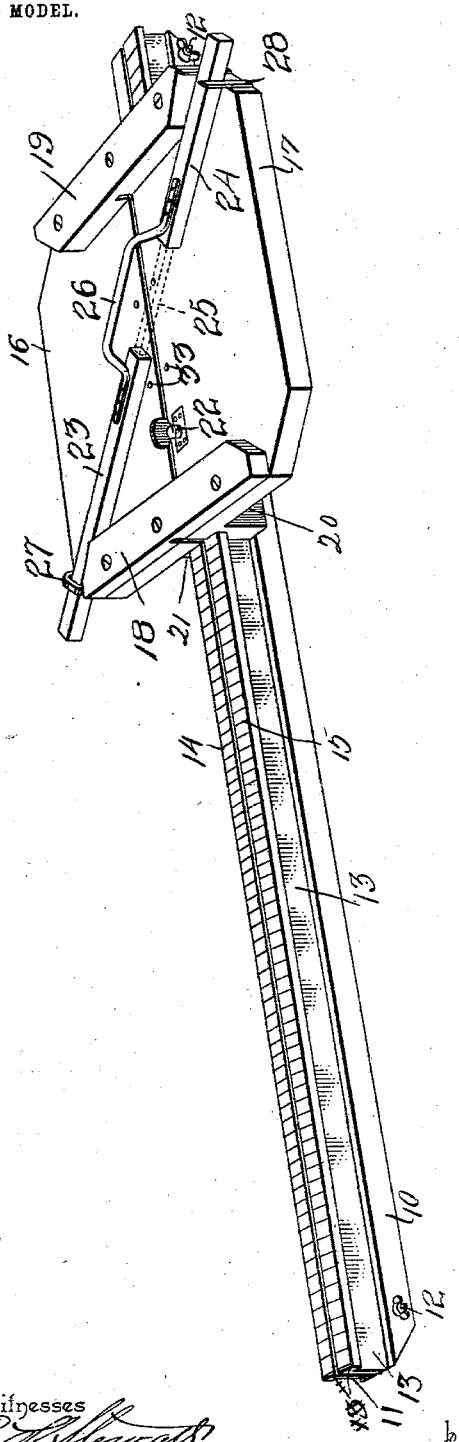
Witnesses
E. H. Stewart
C. N. Woodward
R. Evans and
I. E. Fraser,
Inventors
by C. A. Snow & Co.
Attorneys No. 740,833.

Patented October 6, 1903.

UNITED STATES PATENT OFFICE.

RICHARD EVANS AND IRA E. FRASER, OF MITCHELL, SOUTH DAKOTA.

SAW-FILING DEVICE.

SPECIFICATION forming part of Letters Patent No. 740,833, dated October 6, 1903.

Application filed August 19, 1902. Serial No. 120,213. (No model.)

*To all whom it may concern:*

Be it known that we, RICHARD EVANS and IRA E. FRASER, citizens of the United States, residing at Mitchell, in the county of Davison and State of South Dakota, have invented a new and useful Saw-Filing Device, of which the following is a specification.

This invention relates to devices employed for the purpose of filing saws, and has for its object a device of simple construction which may be employed by an unskilled person, but which may also be employed to advantage to assist a skilled operator in filing and setting saws to enable him to greatly facilitate his work.

The invention consists in certain novel features of construction, as hereinafter shown and described, and specified in the claim.

In the drawing illustrative of the invention the figure is a perspective view of our saw-filing device with the various parts assembled.

The device consists in a longitudinal clamp formed in two parallel members 10 11, adapted to embrace opposite sides of the saw and be compressed thereon, as by clamp-screws, (indicated at 12.) Formed longitudinally in the opposite sides of the clamping members are guideways 13, parallel to each other and affording means for guiding the file-holding-clamp frame.

The upper edges of the members 10 11 are formed level and provided with graduations, as indicated at 14 15, corresponding to the teeth of the saws to be filed, the two independent surfaces of the two clamp-bars providing means for two independent graduations conforming to two or more different sizes or numbers of saw-teeth and may be varied to any desired extent. The graduations may be formed directly upon the clamp-bars, as indicated, or upon separate strips attached to the bars, if preferred.

The portion of the device which will support the file-clamp consists of a base-plate or table formed in two parts 16 17, divided longitudinally, the division-line disposed in vertical alinement with the division between the clamping members 10 11 and registering therewith, so that the teeth of the saw will project upward through the cleft and bring them in proper position for the action of the file.

The base-plate or table 16 17 is provided with depending ribs 20 21, one on each part and formed to engage the channels 13 in the clamping members 10 11, so that the base-plate may be moved freely longitudinally of the clamping members, but are prevented from being removed upward or downward therefrom. The two parts 16 17 of the base-plate or table will be connected by transverse clamp-plates 18 19 arching over the cleft between them, so that the arch-bars will not engage the saw-teeth as the base-plate is moved longitudinally of the clamp-bars. The base-plate 16 17 will be clamped to the members 10 11 when required by a set-screw 22 passing downward through one of the parts of the base-plate or table and engaging the upper surface of one of the clamping members 10 11. By this means the clamping pressure is exerted entirely in a line vertical to the clamping members, which insures the requisite rigid coupling between the parts without danger of lateral displacement.

It will be obvious that the base-plate or table 16 17 is reversible in position upon the clamping-bars, as both sides of the latter are precisely alike and as both sides of the plate are also exactly alike to enable the base-plate or table to be placed upon the clamping members from either end and the file-clamp operated from either side.

The file-clamp consists of two bars 23 24 in longitudinal alinement and adapted to support the file (indicated by dotted lines 25) between their adjacent ends, as shown, and the bars rigidly connected by an arched handle member 26. The file-clamp is positioned diagonally across the plate 16 and the ends disposed in guides 27 28 at diagonally-opposite corners of the plate, the angle of the file-clamp corresponding to the angle at which the teeth are to be filed.

The degree of angularity, of course, may be varied to any extent to adapt the device to different grades of saws and to saws employed for different purposes.

It will be noted that the handle 26 is arched upward a considerable distance above the guide-bars 23 24 and the file held between them, so that the file is exposed to view its entire length.

The keeper or guide-loop 27 will be formed longer vertically than the height of the bars 23 24, so that the bars will have the necessary vertical play to enable the file to do its work properly, while the keeper or guide 28 will be open at the top, so that the file-clamp may be easily removed when required.

In placing the saw in position between the clamping members care must be taken to adjust them so that the roots of the teeth shall come in proper position with the face of the plate or table 16 17, so that when the file has cut down into the teeth far enough to permit the bars 23 24 to engage the upper surface of the base-plate or table the filing will have been completed, so that each tooth will be cut to exactly the same depth and the points in a relatively uniform line horizontally of the saw.

In starting to file the saw the file is set above the first tooth of the saw and the saw adjusted so that the base-plate or table 16 17 will register properly with the gage 14 or 15 corresponding to the saw to be filed. Then after the first is filed the base-plate or table, together with the file-clamp, will be moved along until the base-plate or table registers with the next graduation, which will bring the file in position above the next tooth, and so on throughout the whole length of the saw.

If for any reason the teeth of the saw are irregular, this device will enable the regularity to be perfectly restored, as the bars 23 24 coacting with the gages 14 15 will form teeth exactly the same size and height.

Having thus described our invention, what we claim is—

A device of the class described comprising a pair of clamping members and means for securing the same to a saw, a table adapted to slide on said members, and means for securing the same in position, diagonally and oppositely disposed guide-loops carried by the table, one of said loops being open, and a file-clamp provided with a centrally-disposed arched handle adapted to extend across the table and move in said guide-loops.

In testimony that we claim the foregoing as our own we have hereto affixed our signatures in the presence of two witnesses.

RICHARD EVANS.
IRA E. FRASER.

Witnesses:
   F. A. BIDWELL,
   H. B. MCCAWLEY.